United States Patent Office 3,405,069
Patented Oct. 8, 1968

3,405,069
CHLOROFLUOROALKANE COMPOSITIONS
Ralph John Gilbert Houslay and Robert Leslie McGinty, Runcorn, England, assignors to Imperial Chemical Industries Limited, London, England, a corporation of Great Britain
No Drawing. Filed Sept. 12, 1966, Ser. No. 578,485
Claims priority, application Great Britain, Sept. 16, 1965, 39,581/65; Nov. 24, 1965, 49,942/65
9 Claims. (Cl. 252—182)

ABSTRACT OF THE DISCLOSURE

There is provided a chlorofluoroalkane composition which is resistant to reaction between the chlorofluoroalkane and primary and secondary polyols and amines in the composition. The improvement resides in the use of inhibitors selected from esters of salicylic acid, azobenzene, p-amino azobenzene, pyrrole, N-methyl pyrroles, eugenol, isoeugenol, hydrazine and substituted hydrazines. The composition is useful for making polyurethane foam compositions when there is included a polyol and a polyfunctional isocyanate. The chlorofluoroalkanes function as a blowing agent. From 0.05 to 5% by weight of the inhibitor, based on the weight of the chlorofluoroalkane, is included in the composition.

---

The present invention relates to chlorofluoroalkane compositions. More particularly it relates to compositions comprising a chlorofluoroalkane of the methane or ethane series and compounds which inhibit reaction of the chlorofluoroalkane with polyols and amines employed in manufacturing polyurethane foams.

Low-boiling chlorofluoroalkanes, particularly trichlorofluoromethane, are widely used as blowing agents in producing polyurethane foams by reaction between polyols and polyfunctional isocyanates. A preferred method of producing the polyurethane foams is to incorporate the chlorofluoroalkane blowing agent in the principal polyol component together with any cross-linking agents such as hydroxyalkylamines, glycerol or 1,3-propylene glycol, catalysts, which are usually tertiary amines, and optionally water, which acts as an additional blowing agent, and to blend the mixture with the isocyanate. The heat of reaction of the polyol (and the water when present) with the isocyanate vaporises the blowing agent and produces the desired cell structure in the polyurethane product.

Although chlorofluoroalkanes are in general chemically inert, it has been found that they can react slowly with the polyols and also with amines, particularly with low molecular weight hydroxyalkylamines used as cross-linking agents, notably triethanolamine, causing liberation of hydrogen halide, formation of a precipitate and discolouration of the mixture. This reaction is particularly disadvantageous if it is desired to ship or to store ready for use for any significant time the chlorofluoroalkane in admixture with the polyol and possibly the reactive cross-linking agents and it has been proposed for instance, in British patent specification No. 1,009,041 to inhibit the reaction between chlorofluoroalkanes and primary and secondary polyols by adding to compositions containing either or both the chlorofluoroalkane and the polyol certain specific olefinic compounds, for example isoprene and certain terpenes, vinyl compounds and acrylic compounds.

We have now found that the reaction of chlorofluoroalkane blowing agents with polyols and amines in polyurethane foam blowing systems can be inhibited more effectively by incorporating in compositions containing either or both the chlorofluoroalkane and the polyol a small proportion of a member selected from certain specific compounds as hereinafter defined.

According to the present invention, therefore, we provide a chlorofluoroalkane composition resistant to reaction with primary and secondary polyols and amines which comprises a chlorofluoroalkane of the methane or ethane series and as inhibitor 0.05–5% (preferably 0.1–2%) of its weight of a member of the group consisting of esters of salicylic acid, azobenzene, p-amino azobenzene, pyrrole, N-alkyl pyrroles, eugenol, isoeugenol, hydrazine and substituted hydrazines of structural formulae $R_1(R_2)N.NH_2$ and $R_1HN.NHR_1$ in which formulae $R_1$ is an alkyl, carboxyalkyl, aryl, alkaryl or aralkyl radical and $R_2$ is the same as $R_1$ or is a hydrogen atom.

Within the scope of the invention we also provide a composition as defined in the preceding paragraph comprising additionally a polyol useful for preparing polyurethane foams by reaction with polyfunctional isocyanates in the presence of chlorofluoroalkane blowing agents.

Furthermore we provide a composition as defined in either of the two preceding paragraphs comprising additionally triethanolamine as cross-linking agent.

A chlorofluoroalkane composition according to the invention may contain more than one chlorofluoroalkane of the methane or ethane series. The invention is most preferably applied to compositions comprising trichlorofluoromethane.

Examples of suitable substituted hydrazines for use in compositions according to the invention are 1,1-dimethylhydrazine, hydrazine-monoethylcarboxylate, phenyl-hydrazine, hydrazobenzene and hydrazotoluene. When hydrazine itself is employed it may be added to the compositions in the form of the readily available hydrate. It should be noted that the aromatic hydrazines, for example phenyl-hydrazine, have a very low solubility in the chlorofluoroalkane alone, so that compositions consisting of these two components only should be well agitated to obtain uniform mixing of any solid phase before use. When the polyol component is also present the aromatic hydrazines are completely soluble in the mixture at all useful concentrations.

The polyols employed in compositions according to the invention may be any one or more of those customarily used for the production of polyurethane foams by reaction with a polyfunctional isocyanate in the presence of a chlorofluoroalkane blowing agent. They may be of the types having ether, ester, amide or amine linkages as described for example in the said British patent specification No. 1,009,041 and in British patent specification No. 980,292. As examples of these four types of polyols may be mentioned ether condensation products of alkylene oxides with polyhydric alcohols such as sugar alcohols, trimethylolpropane and glycerol, esters of dicarboxylic acids and polyalkylene glycols, amide condensation products of polyhydric alcohols and polyfunctional isocyanates such as tolylene diisocyanate and condensation products of alkylene oxides with diamines and triamines. Polyols of the last mentioned type, for instance N,N,N',N'-tetrakis(2-hydroxypropyl)-ethylenediamine, may particularly be included in the composition along with other polyols in order to assist viscosity build-up in the early stages of the foaming process by virtue of their cross-linking properties.

The invention is further illustrated by the following examples. Ageing tests were carried out at 40° C. in glass flasks under reflux condensers, and also at 40° and at temperatures up to 80° C. in order to accelerate the tests in tin-plated steel containers closed with tin-plated steel caps on the chlorofluoroalkane with and without stabilisers in admixture with various polyols. Stabilisers used according to the present invention were tested alongside stabilisers of the prior art, namely olefinic compounds proposed as stabilisers in the aforesaid British patent specification No. 1,009,041 and compounds which exhibit keto-enol tautomerism proposed as stabilisers in German Patent No. 1,188,277. Reaction in the mixtures was recorded by visual observation and by estimation of chloride ion liberated.

In the following tables Polyol A is the condensation product of 1 mole of sorbitol with 10 moles of propylene oxide, sold by Atlas Powder Co. under the name "Atlas–G2410" ("Atlas" is a registered trademark). Polyol B is a condensation product of triethanolamine with propylene oxide, having a hydroxyl value of about 450 mg. KOH/g. and a viscosity of about 350 centipoises. Polyol C is a condensation product of trimethylol propane with propylene oxide, having a hydroxyl value of about 540 mg. KOH/g. and a viscosity of about 1800 centipoises. In some of the compositions mixtures of Polyol A, B or C with small amounts of commercial grade triethanolamine or N,N,N′,N′ - tetraskis(2 - hydroxypropyl) - ethylenediamine (available commercially under the registered trademark "Quadrol") as cross-linking agents and/or small amounts of water were tested for reaction with the chlorofluoroalkane, as shown in Tables 1, 3, 5, 6, 9 and 10. All percentages are by weight. The appearance at the start of compositions containing Polyol A was very pale yellow, those containing Polyol B pale yellow, and those containing Polyol C almost colourless.

TABLE 1

Tests carried out in glass flasks at 40° C.

Compositions consisted of Polyol B (62%), triethanolamine (7%), trichlorofluoromethane 31%, to which was added stabiliser as shown in column 1.

| Stabiliser, percent w./w. on amount of CCl₃F | Duration of test, days | Appearance at end of test | Chloride ion liberated, p.p.m. |
|---|---|---|---|
| None | 1 | Pale yellow | 390 |
| Do | 3 | do | 500 |
| Do | 5 | Yellow, solids present | 1,630 |
| Do | 9 | Amber, solids present | 2,210 |
| 1,1-dimethyl-hydrazine, 1.0 | 16 | Pale yellow | 280 |
| 1,1-dimethyl-hydrazine, 0.25 | 32 | do | 320 |
| Hydrazobenzene, 1.3 | 28 | Orange | 880 |
| Hydrazotoluene, 2.0 | 28 | do | 1,020 |
| Phenyl-hydrazine, 0.8 | 20 | Yellow, trace of solids | 1,300 |
| Hydrazine-mono-ethylcarboxylate 2.0 | 14 | Pale yellow | 1,500 |
| Prior-art Stabilisers: | | | |
| Ethyl-aceto-acetate, 1.35 | 6 | Solids present | 1,070 |
| Acetyl-acetone, 1.1 | 5 | do | 960 |
| Ethyl-benzoyl-acetate, 0.75 | 10 | do | 1,195 |

TABLE 2

Tests carried out in tin-plated steel containers at 60° C. for 7 days.

Compositions consisted of Polyol A (64%), trichlorofluoromethane (36%), to which was added stabiliser as shown in column 1.

| Stabilizer, percent w./w. on amount of CCl₃F | Appearance at end of test | Chloride ion liberated, p.p.m. |
|---|---|---|
| None | Pale yellow | 440 |
| 1,1-dimethyl-hydrazine, 0.5 | do | 240 |
| Prior-art Stabilizers: | | |
| Di-isobutylene, 0.5 | do | 330 |
| Limonene, 0.5 | do | 290 |

TABLE 3

Tests carried out in tin-plated steel containers at 60° C. for 7 days.

Compositions consisted of Polyol A (60%), triethanolamine (7%), trichlorofluoromethane (33%), to which was added stabiliser as shown in column 1.

| Stabilizer, percent w./w. on amount of CCl₃F | Appearance at end of test | Chloride ion liberated, p.p.m. |
|---|---|---|
| None | Yellow, considerable solids present. | 2,320 |
| 1,1-diethyl-hydrazine, 0.5 | Yellow, some solids present. | 580 |
| Prior-art Stabilizers: | | |
| Di-isobutylene, 0.5 | do | 1,050 |
| Limonene, 0.5 | do | 1,330 |

TABLE 4

Tests carried out in tin-plated steel containers.

Compositions consisted of Polyol B (64%), trichlorofluoromethane (36%), to which was added stabiliser as shown in column 1.

| Stabiliser, percent w./w. on amount of CCl₃F | Temp., ° C. | Duration of test, days | Appearance at end of test | Chloride ion liberated, p.p.m. |
|---|---|---|---|---|
| None | 40 | 7 | Pale yellow | 530 |
| Do | 40 | 14 | Amber | 840 |
| Do | 60 | 7 | Deep amber | 1,620 |
| 1,1-dimethyl-hydrazine, 0.1 | 40 | 7 | Pale yellow | 350 |
| 1,1-dimethyl-hydrazine, 0.1 | 40 | 14 | do | 290 |
| 1,1-dimethyl-hydrazine, 0.5 | 60 | 7 | Light amber | 850 |
| Prior-art Stabilizers: | | | | |
| Limonene, 0.1 | 40 | 7 | Pale yellow | 825 |
| Limonene, 0.5 | 60 | 7 | Amber | 1,490 |

TABLE 5

Tests carried out in tin-plated steel containers.

Compositions consisted of Polyol B (59%), triethanolamine (7%), trichlorofluoromethane (33%), water (1%), to which was added stabiliser as shown in column 1.

| Stabiliser, percent w./w. on amount of CCl₃F | Temp., ° C. | Duration of test, days | Appearance at end of test | Chloride ion liberated, p.p.m. |
|---|---|---|---|---|
| None | 40 | 14 | Deep amber, solids present. | 2,350 |
| Do | 50 | 7 | Amber, solids present. | 1,690 |
| Do | 80 | 2 | do | 4,400 |
| 1,1-dimethyl hydrazine, 0.25 | 40 | 14 | Pale yellow | 220 |
| Do | 50 | 7 | do | 220 |
| Do | 50 | 7 | do | 230 |
| 1,1-dimethyl hydrazine, 0.25 | 80 | 2 | do | 940 |
| Hydrazobenzene, 0.25 | 40 | 14 | Yellow | 460 |
| Hydrazotoluene, 0.15 | 40 | 14 | Amber | 390 |
| Prior-art stabilizers: | | | | |
| Isoprene, 0.3 | 40 | 14 | Pale yellow | 510 |
| Di-isobutylene, 0.25 | 50 | 7 | Amber, solids present. | 840 |
| Do | 50 | 7 | do | 850 |
| Limonene, 0.25 | 50 | 7 | do | 1,270 |
| Do | 50 | 7 | do | 1,070 |

TABLE 6

Tests carried out in tin-plated steel containers at 80° C. for 2 days.

Comparison of reactivity of unstabilised trichlorofluoromethane (U) and trichlorofluoromethane stabilised by addition of 0.5% w./w. of 1,1-dimethyl-hydrazine (S) with Polyols A, B and C and with these polyols in admixture with triethanolamine (TEA), "Quadrol" and water where shown.

| Polyol type, percent | CCL₃F, percent | TEA | "Quadrol" | Water | Appearance at end of test | Chloride ion, p.p.m. |
|---|---|---|---|---|---|---|
| A, 63 | 35(U) (S) | None | None | 2 | Yellow<br>Pale yellow | 530<br>200 |
| A, 60 | 33(U) (S) | 7 | None | None | Dark, solids present<br>Amber | 3,850<br>980 |
| A, 60 | 32(U) (S) | 7 | None | 1 | Dark, solids present<br>Amber | 4,475<br>890 |
| A, 60 | 33(U) (S) | None | 7 | None | Deep amber<br>Amber | 1,725<br>610 |
| A, 60 | 32(U) (S) | None | 7 | 1 | Deep amber<br>Amber | 2,590<br>540 |
| B, 63 | 36(U) (S) | None | None | 1 | Amber<br>Pale amber | 1,370<br>930 |
| B, 60 | 33(U) (S) | 7 | None | None | Dark, solids present<br>Pale yellow | 4,300<br>600 |
| B, 60 | 32(U) (S) | 7 | None | 1 | Dark, solids present<br>Pale yellow | 4,400<br>850 |
| B, 59 | 32(U) (S) | 8 | None | 1 | Dark<br>Pale yellow | 3,100<br>850 |
| C, 60 | 33(U) (S) | 7 | None | None | Dark, solids present<br>Very pale yellow | 2,460<br>400 |
| C, 60 | 32(U) (S) | 7 | None | 1 | Dark, solids present<br>Very pale yellow | 1,800<br>550 |
| C, 59 | 32(U) (S) | None | 8 | 1 | Amber<br>Very pale yellow | 1,280<br>120 |

TABLE 7

Tests carried out in tin-plated steel containers at 40° C. for 14 days.

Compositions consisted of Polyol B (64%), trichlorofluoromethane (36%), to which was added 0.5% of stabiliser calculated on the weight of the trichlorofluoromethane where shown in column 1.

| Stabiliser | Appearance at end of test | Chloride ion liberated, p.p.m. |
|---|---|---|
| None | Yellow | 1,320 |
| Eugenol | do | 310 |
| Iso-eugenol | do | 210 |
| Ethyl salicylate | Pale Yellow | 430 |
| Pyrrole | Yellow | 670 |
| N-methyl pyrrole | do | 510 |
| Azobenzene | Amber | 800 |
| p-Amino azobenzene | do | 960 |
| Prior-art stabilizers: | | |
| Di-isobutylene | Yellow | 1,200 |
| Limonene | Amber | 1,250 |

TABLE 8

Tests carried out in tin-plated steel containers at 40° C. for 14 days.

Compositions consisted of Polyol B (59%), triethanolamine (7%), trichlorofluoromethane (33%), water (1%), to which was added 0.5% of stabiliser calculated on the weight of the trichlorofluoromethane where shown in column 1.

| Stabiliser | Appearance at end of test | Chloride ion liberated, p.p.m. |
|---|---|---|
| None | Dark yellow, solids present | 1,330 |
| Eugenol | Yellow | 370 |
| Iso-eugenol | do | 1,010 |
| Ethyl salicylate | do | 555 |
| Pyrrole | do | 475 |
| N-methyl pyrrole | do | 425 |
| Azobenzene | Amber | 425 |
| p-Amino azobenzene | do | 905 |
| Prior-art stabilizers: | | |
| Di-isobutylene | Yellow | 870 |
| Limonene | Yellow, solids present | 1,850 |

TABLE 9

Tests carried out in tin-plated steel containers at 40° C. for 14 days.

Compositions consisted of Polyol A (50%), "Quadrol" (20%), 1,1,2-trichloro-1,2,2-trifluoroethane (30%), to which was added 0.5% of stabiliser calculated on the weight of the trichlorotrifluoroethane where shown in column 1.

| Stabiliser | Appearance at end of test | Chloride ion liberated, p.p.m. |
|---|---|---|
| None | Dark amber | 2,900 |
| 1,1-dimethyl-hydrazine | Yellow | 510 |
| Pyrrole | do | 800 |
| Eugenol | do | 1,540 |

TABLE 10

Tests carried out in tin-plated steel containers at 40° C. for 14 days.

Compositions consisted of Polyol B (50%), triethanolamine (20%), 1,1,2 - trichloro - 1,2,2 - trifluoroethane (30%), to which was added 0.5% of stabiliser calculated on the weight of the trichlorotrifluoroethane were shown in column 1.

| Stabiliser | Appearance at end of test | Chloride ion liberated, p.p.m. |
|---|---|---|
| None | Amber, solids present | 2,400 |
| 1,1-dimethyl-hydrazine | Pale yellow | 350 |
| Pyrrole | Dark yellow | 740 |
| Ethyl salicylate | Deep amber, solids present | 1,670 |
| Eugenol | Amber, solids present | 1,600 |

What we claim is:

1. A chlorofluoroalkane composition of the methane or ethane series, useful as a blowing agent in the preparation of polyurethane foams comprising as an inhibitor, from 0.05–5% by weight of said chlorofluoroalkane of a member selected from the group consisting of the ethyl ester of salicyclic acid, azobenzene, p-amino azobenzene, pyrrole, N-methyl pyrrole, eugenol, iso-eugenol, hydrazine, 1,1 - dimethyl hydrazine, hydrazine monoethylcarboxylate, phenyl hydrazine, hydrazotoluene.

2. A composition according to claim 1, wherein the proportion of inhibitor is in the range of 0.1–2% by weight of the chlorofluoroalkane.

3. A composition according to claim 1, wherein the chlorofluoroalkane is trichlorofluoromethane.

4. A composition according to claim 2, wherein the chlorofluoroalkane is trichlorofluoromethane.

5. A composition according to claim 1 wherein the inhibitor is selected from the group consisting of azobenzene, ethyl salicylate, and p-amino azebenzene.

6. A composition according to claim 1, wherein the inhibitor is selected from the group consisting of pyrrole and N-methyl pyrrole.

7. A composition according to claim 1, wherein the inhibitor is selected from the group consisting of eugenol and iso-eugenol.

8. A polyol composition comprising a chlorofluoroalkane of the methane or ethane series, useful as a blowing agent in the preparation of polyurethane foams and as an inhibitor, from 0.05%–5% by weight of said chlorofluoroalkane of a member selected from the group consisting of the ethyl ester of salicyclic acid, azobenzene, p-amino azobenzene, pyrrole, N-methyl pyrrole, eugenol, iso-eugenol, hydrazine, 1,1-dimethyl hydrazine, hydrazine monoethylcarboxylate, phenyl hydrazine, hydrazobenzene and hydrozotoluene.

9. A composition according to claim 8, which further comprises triethanolamine as a cross-linking agent.

References Cited

UNITED STATES PATENTS

| | | | |
|---|---|---|---|
| 2,848,501 | 8/1958 | Lloyd | 260—611.5 |
| 2,958,711 | 11/1960 | Skeeters | 260—652.5 |
| 3,085,116 | 4/1963 | Kvalnes | 260—652.5 |
| 3,090,818 | 5/1963 | Long | 252—188.3 X |

LEON D. ROSDOL, *Primary Examiner.*

STANLEY D. SCHWARTZ, *Assistant Examiner.*